United States Patent
Stewart et al.

(10) Patent No.: US 8,023,654 B2
(45) Date of Patent: Sep. 20, 2011

(54) SECURING MULTIMEDIA NETWORK COMMUNICATION

(75) Inventors: Paul J. Stewart, Los Altos, CA (US); Dirk Balfanz, Redwood City, CA (US); Glenn E. Durfee, Belmont, CA (US); Diana K. Smetters, Belmont, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1061 days.

(21) Appl. No.: 11/612,001

(22) Filed: Dec. 18, 2006

(65) Prior Publication Data

US 2008/0144824 A1    Jun. 19, 2008

(51) Int. Cl.
*H04L 29/00*    (2006.01)

(52) U.S. Cl. ............ 380/257; 380/25; 380/34; 380/270; 713/150; 713/155

(58) Field of Classification Search ..................... 380/33, 380/34, 42, 257–260, 270
See application file for complete search history.

(56) References Cited

U.S. PATENT DOCUMENTS

| | | | |
|---|---|---|---|
| 5,717,718 A * | 2/1998 | Rowsell et al. | 375/260 |
| 6,757,823 B1 | 6/2004 | Rao et al. | |
| 6,842,449 B2 | 1/2005 | Hardjono | |
| 6,910,129 B1 | 6/2005 | Deng et al. | |
| 7,451,307 B2 * | 11/2008 | Matsushima | 713/156 |
| 2002/0129236 A1 | 9/2002 | Nuutinen | |
| 2003/0182553 A1 | 9/2003 | Medvinsky | |
| 2004/0008666 A1 | 1/2004 | Hardjono | |
| 2005/0002526 A1 | 1/2005 | Choi et al. | |
| 2005/0174937 A1 | 8/2005 | Scoggins et al. | |
| 2005/0222815 A1 * | 10/2005 | Tolly | 702/185 |
| 2006/0095766 A1 | 5/2006 | Zhu et al. | |
| 2006/0111913 A1 | 5/2006 | Oh | |
| 2007/0274293 A1 * | 11/2007 | Forbes | 370/352 |

OTHER PUBLICATIONS

Loud and Clear: Human-Verifiable Authentication Based on Audio, Michael T. Goodrich, Michael Sirivianos, John Solis, Gene Tsudik, and Ersin Uzun, Department of Computer Science, University of California, Urvine, 26th IEEE International Conference on Distributed Computing Systems (ICDCS'06) IEEE 2006.

* cited by examiner

*Primary Examiner* — Vivek Srivastava
*Assistant Examiner* — Helai Salehi
(74) *Attorney, Agent, or Firm* — Marger Johnson & McCollom, P.C.

(57) ABSTRACT

A method for securing human to human communication over a network includes receiving, by a first computer, an incoming authenticated data stream from a second computer over a first communication channel, the incoming authenticated data stream having been computed using an incoming digital experiential data stream and a first imprint, and extracting the first imprint from the incoming authenticated data stream. The incoming authenticated data stream is then presented for sensory experience by a human. An outgoing digital experiential data stream is then input and the method computes a second imprint associated with the first computer and computes an outgoing authenticated data stream using the outgoing digital experiential data stream and the second imprint. A second communication channel is then secured from the first computer to the second computer using the first imprint, the second communication channel suitable for sending the outgoing authenticated data stream to the second computer.

19 Claims, 6 Drawing Sheets

FIG. 6
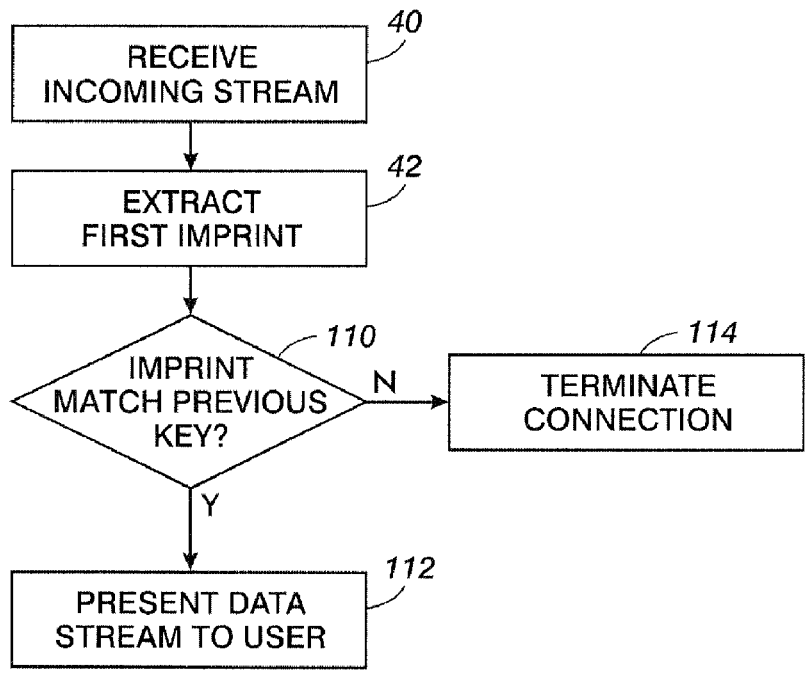
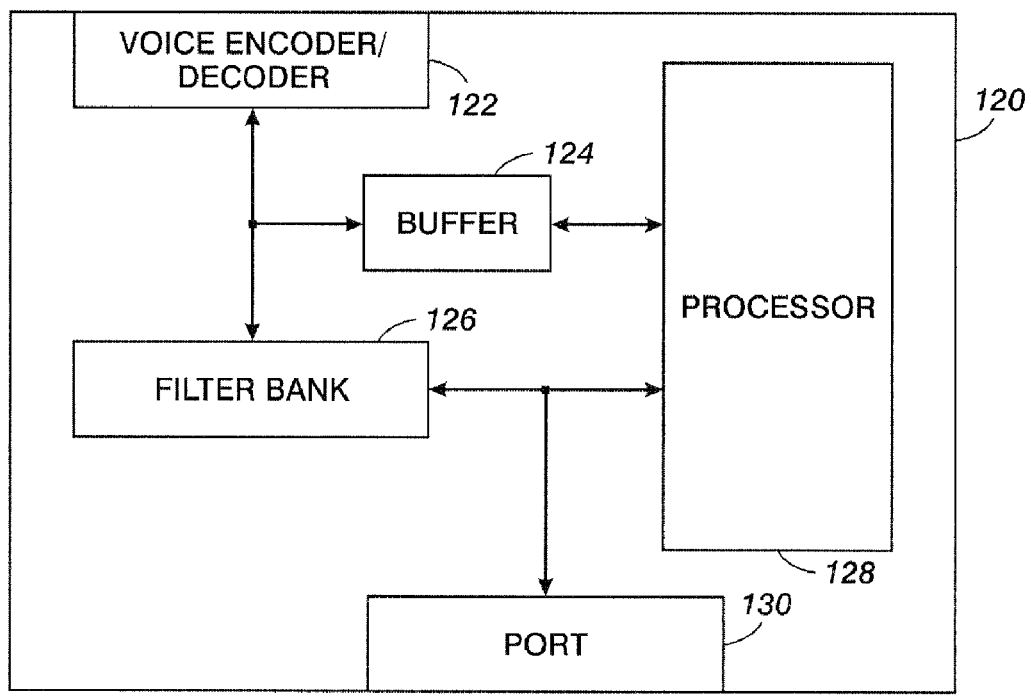
FIG. 7

SECURING MULTIMEDIA NETWORK COMMUNICATION

BACKGROUND

Voice over Internet Protocol (VoIP) phone calls are susceptible to man-in-the-middle attacks in which a third party assumes the identity of one of the parties to the call. This assumption may allow the third party to gather information from one or both of the calling parties. VoIP calls generally involve two users having a conversation through a data network rather than through the traditional public switched telephone network (PSTN). The term VoIP as used here includes any packet switched network, whether that network operates in accordance with the Internet Protocol or not.

The PSTN operates as a circuit-switched network in which voice signals travel through a circuit or path formed by switches at various points in the circuit. A person attempting a man-in-the-middle (MIM) attack would have to breach the circuit, such as by tapping one end or the other. Packet switched networks encode voice signals into digital data and then packetize that data and route the packets into the network. No dedicated circuit exists.

For a typical phone user, a MIM attack could capture and 'record' the data packets, allowing the construction of audio files. The information in these audio files would allow the attacker to gain information about the user. A MIM attack could also allow an attacker to assume the identity of the other party by intercepting the packets.

Generally, end-to-end security provides the strongest defense to these attacks. However, unless two users both reside in the same VoIP provider's network, end-to-end security will typically not exist. This type of system, within the same VoIP provider network, constitutes a 'closed' system. Most users will not operate in a closed system and will need a way to provide end-to-end security in an open system.

For open systems, most security methods involve encryption. Users encrypt data frames containing multimedia conversations to prevent intermediate nodes from gaining any useful information about the content of the communication. However, in order for end-to-end encryption to exist, the two parties participating in a phone call must agree on cryptographic keys to encrypt their data frames. Absent Public Key Infrastructures or pre-shared keys, such a key exchange must occur in the 'clear,' allowing a MIM attacker to acquire the keys from each endpoint and perform pair-wise secure setup with each endpoint. The attacker would then pass along the media information after inspecting and recording its contents.

SUMMARY

One embodiment is a method for securing human to human communication over a network includes receiving, by a first computer, an incoming authenticated data stream from a second computer over a first communication channel, the incoming authenticated data stream having been computed using an incoming digital experiential data stream and a first imprint, and extracting the first imprint from the incoming authenticated data stream. The incoming authenticated data stream is then presented for sensory experience by a human.

An outgoing digital experiential data stream is then input and the method computes a second imprint associated with the first computer and computes an outgoing authenticated data stream using the outgoing digital experiential data stream and the second imprint. A second communication channel is then secured from the first computer to the second computer using the first imprint, the second communication channel suitable for sending the outgoing authenticated data stream to the second computer.

BRIEF DESCRIPTION OF THE DRAWINGS

FIG. 6 shows an example of a method of using key imprints to verify previously exchanged keys.

FIG. 7 shows an example of a device capable of performing key exchange using key imprints.

DETAILED DESCRIPTION OF THE EMBODIMENTS

Figure 1:
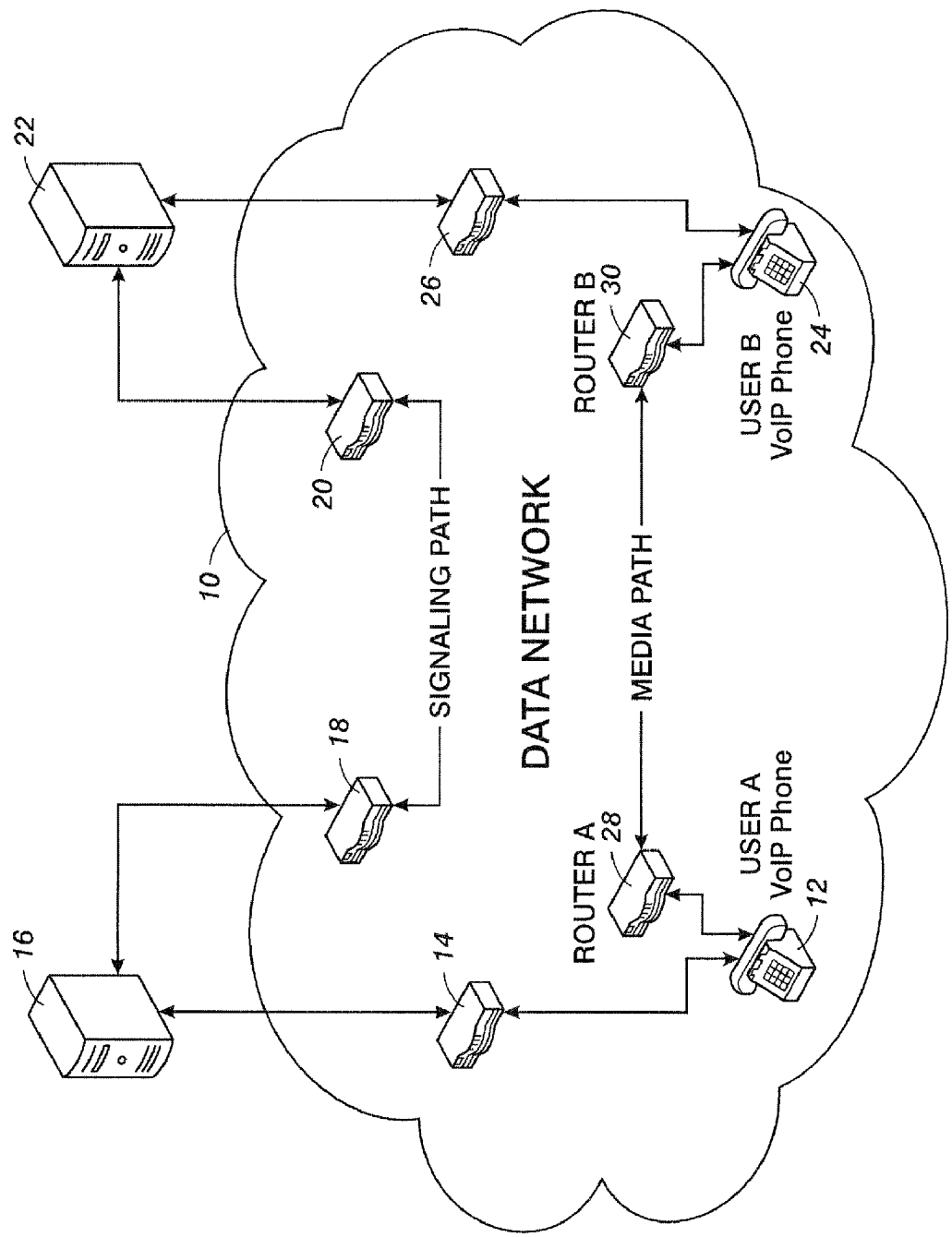
FIG. 1 shows an example of a VoIP network used to make a VoIP call.

FIG. 1 shows an example of a Voice-Over-Internet-Protocol (VoIP) network. VoIP, as used here, will refer to any voice over data networks call. For user A at phone 12 to make a call to user B at phone 24, the two phones must find each other and convey signaling information. The two endpoints 12 and 14 register with their respective VoIP providers 16 and 22. When user A calls user B, user A's VoIP provider 16 contacts user B's VoIP provider 22. VoIP provider 22 knows the location of user B and forwards the call to user B's phone 24. This setting up and forwarding forms a signaling path.

When user B answers the call, the endpoint 12 and 24 set up a 'direct' connection or media path for delivery of the audio data. Note that the calls from user A's phone to the VoIP provider 16 may travel through one or more routers such as 14. The signaling path may also involve one or more routers such as 18 and 22. The media path may form a 'direct' connection in that the VoIP providers no longer participate in the connection, the connection may also involve one or more routers such as 28 and 30 in the call.

Due to the open nature of the paths involving several different intermediate points such as the router, both the signaling and media paths have vulnerabilities to attackers. One solution involves the use of a public-key infrastructure (PKI). However, the two users would have to participate in the same PKI, normally reserved for users within the same system. If the users reside in the same system, the system is closed and end-to-end security exists generally.

In an open system, absent such a PKI, users can perform a "key exchange". In such a key exchange, each user has two keys, a public key and a private key. The user gives the public key to parties who want to send the user secured information. The sender encodes the information with the recipient user's public key, allowing the user to decode the information with the private key. In order for information to be exchanged, both users must provide the other with the respective user's public key.

If there is a pre-arranged secure channel for the key exchange between the sender and the recipient, end-to-end security is provided. However, as VoIP becomes more prevalent, more users will be calling more recipients without pre-arranged key exchanges, and will have to engage in unauthenticated key exchanges to gain end-to-end security. In the current state of the art, such unauthenticated key exchanges are susceptible to MIM attacks.

Figure 2:
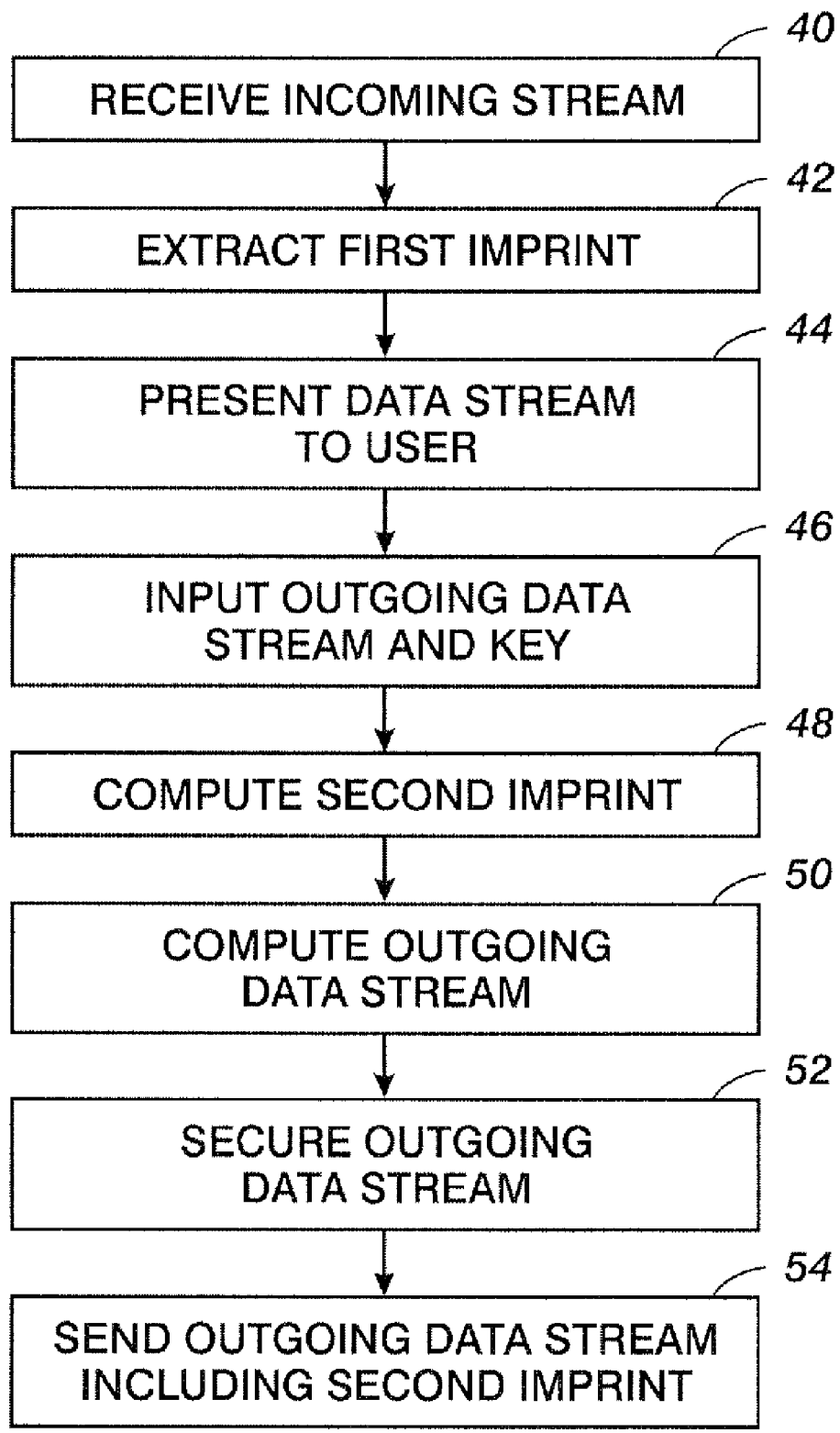
FIG. 2 shows an example of a method of receiving keys using key imprints at a receiving endpoint.

The present disclosure describes a system in which key exchanges can be performed securely in the absence of a PKI or a pre-arranged secure channel. FIG. 2 shows an example of a process in which users exchange keys in a context in which no pre-arranged security or PKI existed. One must note that the term key as used here includes any type of encoding scheme or otherwise used to secure communications, including public/private key pairs; information about keys, including hashes of keys, etc.; nonces; certificates; and keys including error correction.

The system uses what will be referred to as key imprints in the data stream to authenticate the key exchange. Key imprints make it possible to detect man-in-the-middle attacks in certain special situations. A real-time audio conversation is one such situation. Key imprints rely on humans to consume the audio data in real-time and while doing so to verify the authenticity of the content, e.g., verify that the voice is indeed that of the anticipated caller, and that he or she participates naturally in the conversation (as opposed to a recording of the caller's voice).

Key imprints are similar to what is known in the art as watermarks, in that it should be hard for an attacker to remove an imprint. There are, however, some differences to watermarks. For example, key imprints may be noticeable in the data stream where key-imprinted audio may sound different from the original audio. Changing an imprint or adding a second imprint to a key-imprinted audio stream should substantially degrade the quality of the data stream such as an audio stream.

One must note that the term key imprint as used here includes any type of scheme used to encode keys or key-related information, including public/private key pairs; information about keys, including hashes of keys, nonces, certificates, and keys including error correction.

In FIG. 2, user B receives an incoming authenticated data stream from user A, comprising both an experiential data stream such as an audio stream and a key imprint. At 42, user B extracts the imprint associated with user A, imprinted in one of many methods discussed later. The system presents the experiential data stream, such as the phone call, to user B at 44. As user B responds, his phone generates an outgoing data stream. The system takes the outgoing data stream and user B's key and generates a second imprint at 48 and an outgoing authenticated data stream at 50.

In one embodiment of the invention, the imprint extracted from the incoming data stream comprises user A's public key. Using the imprint, the system then secures the outgoing, authenticated (imprinted) data stream using user's A public key at 52 to encrypt the outgoing, imprinted data stream to user A at 54.

Figure 3:
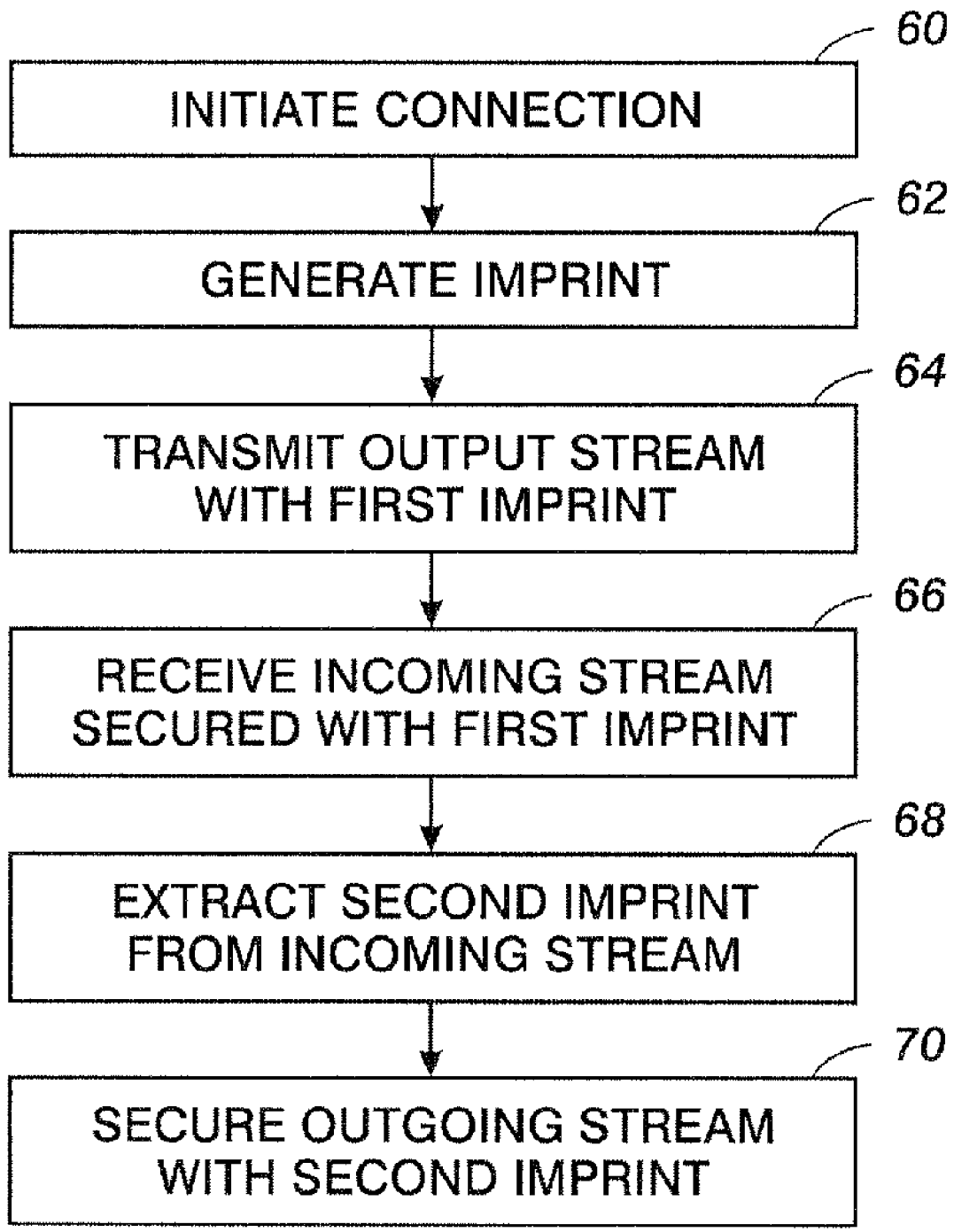
FIG. 3 shows an example of a method of sending keys using key imprints at a sending endpoint.

FIG. 3 shows an example of a method of securing communications from the sender's perspective. At 60, user A initiates the connection. At 62, user A generates the imprint. The user's phone or system 12 may generate the imprint in one of many ways.

In a first example, the system divides the user's voice signals up into high and low frequency subbands. For some predetermined interval, the system transmits only the high or low frequencies of user A's voice. In a simplified example, assume the user A's public key begins with the sequence of bits 0-1-1-0. The system transmits only the low frequency portion for 100 milliseconds (msec), then only the high frequency portion for 200 msecs, and then only the low frequency portion for 100 msecs. The receiving system could perform a frequency analysis for the frequencies received during a particular portion and extract the imprint of 0-1-1-0.

For a MIM attack, the attacker would have to change up the order of the bits to match his public key. For example, if the attacker uses a key of 0-0-1-0, he would have to replace the high frequencies of user A's voice with the corresponding low frequencies of user A's voice representing the same utterance. This low frequency information of the second portion of the stream does not exist in the stream, because user A transmits only the high frequencies for the second portion. The MIM attacker would have to perform an analysis on the first portion and approximate the low frequency of the second portion in a tenth of a second or less, a difficult if not impossible task.

An additional security measure occurs in this scenario because the data stream being received is an 'experiential' stream, experienced by a human user. In the case of a phone call, the user experiences an audio interaction. User B will notice if the second portion of the stream of user A's voice does not match the first. Matching does not refer to the matching low and high frequency subbands, as much as matching the sound of user A's voice. While the audio signal will degrade somewhat because of the missing subbands, user B would still recognize user A's voice.

In this manner, the user can monitor the security of the data stream in a more intuitive fashion, by the quality of the signal. Other techniques require that the user have high sophistication and knowledge to recognize an attack, such as where the user needs to ensure that the identity information exchanged in the metadata actually matches the metadata of the party to whom that user is speaking. Indeed, in approaches set out here, the user may actually react to the poor quality of the audio signal generated by a MIM attacker and hang up the call without any regards to security.

Figure 4:
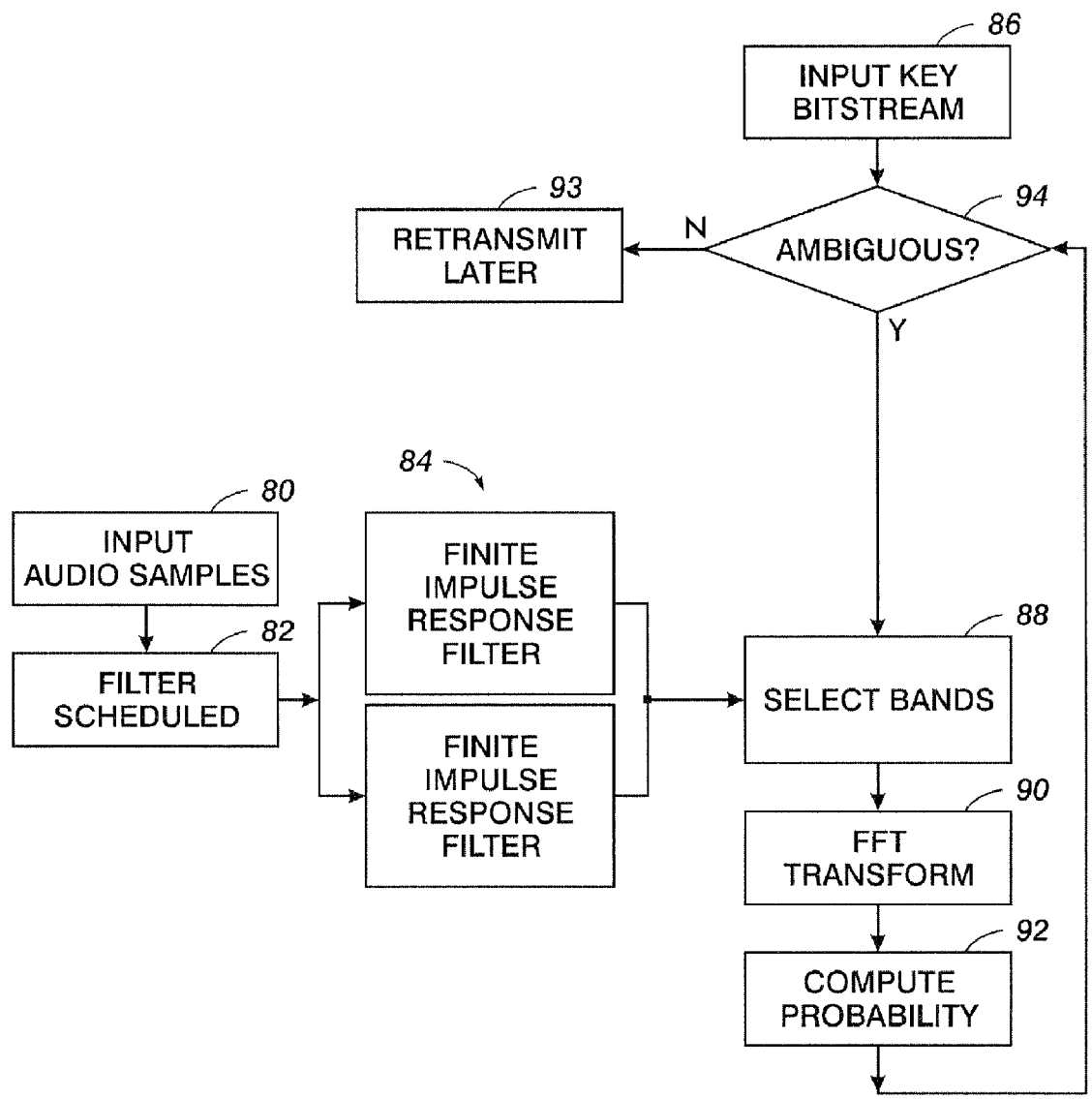
FIG. 4 shows an example of a frequency comb method of generating key imprints.

In implementation, however, using only the lower or high half of the frequency spectrum of a user's voice may make it difficult to recognize another's voice. Use of a frequency comb to divide the frequency spectrum into 'teeth' may alleviate this problem. FIG. 4 shows an example of this sending process.

At 80, user A speaks giving the system input audio samples. A filter scheduler or controller 82 directs the audio samples to a pair of frequency domain filters 84 such as finite impulse response (FIR) filters, each of which extracts a band of frequencies from the audio samples.

Meanwhile, the system receives as an input a key bit stream at 86. The key bit stream provides the data to select subbands of the frequencies at 88. In one example, the system separates the subbands into groups such that neighboring groups of subbands are put into separate groups, such as having eight bands of frequencies and putting subbands 1, 3, 5 and 7 into one group, and subbands 2, 4, 6 and 8 into another. The system then combines the bands into a single 'even' combination stream and a single 'odd' combination stream. Transmission of one combination such as the even combination during a predetermined time interval would result in a '0' and transmission of the odd combination would result in a '1.' In this manner, the imprinted audio stream would not suffer as much degradation due to missing large 'chunks' of frequencies, but would result in a smoother audio transmission.

As a further security measure, the system may imprint one bit of the imprint over several phonemes. For example, consider a MIM attack in which the MIM has replaced B's public key with his own. The MIM now needs to alter the imprint on the audio coming from B to match. On average, the MIM's key fingerprint will differ in half of the bits from the imprint user B left on the audio. One way the attacker can send his imprint, instead of user B's, is to send along user B's unmodified audio whenever there is a bit in B's imprint that agrees with the attacker's, and send along older audio from Bob that encodes a bit of the attacker's choice if the bits do not match.

The audio that user A receives will sound something like the correct audio with minor degradation. The receiving phone will not notice a mismatch, because there is not one, and the MIM attack will have succeeded.

As a counter to this, the system may imprint one bit over several phonemes. In natural language, phonemes rarely last longer than 100 milliseconds. If the attacker wants to change the imprint from B's imprint to his, the audio heard may have words repeated and be disjointed and confusing. The users would probably just hang up the phone. Imprinting over several phonemes results in a degradation of the audio stream during a MIM attack that would cause the users to terminate the session.

Regardless of how the system determines '1s' and '0s,' it may need some accommodation of intervals of silence. At 88 in FIG. 4, the system selects the subbands for transmission based upon the key input. The system then tests the transmission at 90 to ensure that the receiver can reconstruct the imprint correctly. In the example of FIG. 4, the system takes the prospectively transmitted subbands and performs a Fast Fourier Transform (FFT) on the subbands. The system then computes the probability of determining a 1 or a 0 from the FFT at 92. If the probability results in an ambiguity, the bit is retransmitted later at 93.

Figure 5:
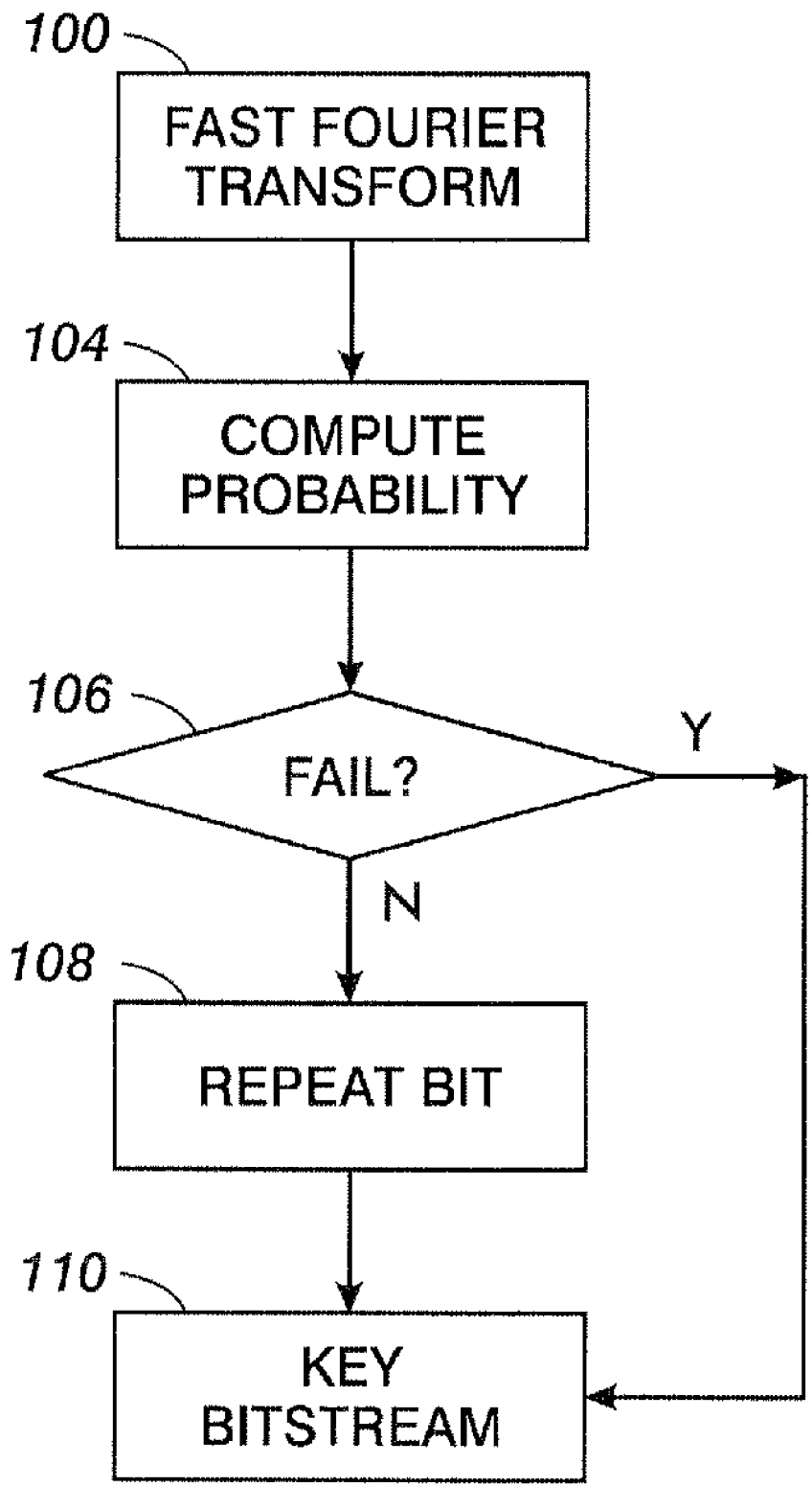
FIG. 5 shows an example of a frequency comb method of extracting key imprints.

On the receiving side, intervals of silence or ambiguous receptions result in a similar determination. FIG. 5 shows an example of resolving an ambiguous transmission. At 100 the receiving system at user B computes the FFT of the received signal. The system then determines the probability that the transmission is a 1 or a 0. The system then determines if the decode failed at 106, such as by a transmission that does not match either a 0 or a 1. If necessary, the system will receive the next segment of the transmission for the same bit in the key imprint at 108. If the decode does not fail at 106, the result becomes the next bit in the key bit stream.

In addition to resolving ambiguous transmission, the system may need to synchronize between sending and receiver to avoid issues with lost packets. One embodiment employs timestamps associated with the packets to index into the imprint. Many protocols such as SRTP (Secure Real-time Transfer Protocol) employ timestamps to allow identification of a packet's place in a particular stream. These timestamps may allow the system to use the timestamps to track which bits of the key fingerprint is imprinted into the packets actually received.

Returning to the sending side and FIG. 3, once the system generates the imprint at 62, the outgoing stream with the first imprint transmits at 64. The receiver at user B then undergoes a process similar to that discussed with regard to FIG. 2, resulting in reception of an incoming stream at 66 by user A. The incoming stream is secured using user's A public key. The system at user A then decodes the stream using user A's private key. The second imprint is then extracted from the stream at 68. In one embodiment of the invention, the extraction of the second imprint provides user A with user B's key. Once user A has extracted user B's key, user A can transmit securely using user B's key at 70.

One embodiment of an imprint may include using a previously exchanged key. For example, if user A and user B exchange keys 'out of band,' in a channel other than the media path, the imprint may allow the users to verify that the person on the other end of the communication uses the correct key. For example, user A and user B exchange keys over an insecure channel. User A then begins to transmit using user B's key. Within the transmission, user A imprints a hash of user A's key. Using the imprint, user B's system secures the outgoing, authenticated (imprinted) data stream at step 52 in FIG. 2 by ensuring that the hash extracted from the imprint matches the hash of the key used to encrypt the outgoing data stream.

FIG. 6 shows an example of the process for user B. User B receives the incoming stream at 40, just as in FIG. 2. User B decodes the stream using his key and then extracts the first imprint, in this case a hash of user A's key. At 110, user B's system determines if the key received as an imprint matches the previously sent key. If the keys do not match, the system terminates the connection at 114. If the keys do match, the process continues at 112, similar to FIG. 2. A similar process would occur at the sender's phone or system.

Yet another embodiment of an imprint may include using keys that users A and B previously used to authenticate key agreement protocol messages, such as those found in the Diffie-Hellman mode of the MIKEY Multimedia Internet Keying protocol. In such an embodiment, users A and B would first engage in a key agreement protocol, signing their respective key agreement messages with private signing key, and sending their public signing key along to the other party. They then imprint their public signing keys, or hashes thereof, into their audio stream. At 110, user B's system determines if the key received as an imprint matches the key A used to authenticate his key agreement messages to ensure that the other party is really user A.

In one embodiment, this process may occur during a second conversation between users A and B. During a first conversation, users A and B use the imprinting and extraction process without any previous key exchange as discussed above. Users A and B then store the keys extracted from that process and associate those keys with the other user. When a second conversation occurs between users A and B, then, the imprint mentioned in FIGS. 2 and 3 is not the imprint of the original key, but the imprint of the hash of the key for verification, as mentioned above.

The systems that implement these processes may currently exist but merely require software to update their operations. Generally these devices will contain some sort of processor capable of executing instructions in the form of code. FIG. 7 shows an example of such a device.

The device 120 has a voice encoder 122. The voice encoder takes the natively analog signals of human voice and digitizes them into digital signals. These digitized input audio signals then travel to the filter bank 126 or other filtering structure for division into frequency subbands. Prior to dividing the digitized signals into subbands, the audio signal may undergo segmentation, with each segment corresponding to a particular length of time predetermined to be one bit interval for transmission. In that length of time, the combination of subbands transmitted will correspond to a 1 or a 0.

The processor 128 performs the selection of the subbands based upon the key bit stream. The buffer 124 or other memory structure may store the key bit stream for input to the processor, or the processor may retrieve it from elsewhere. The processor 128 operates on the voice stream to imprint the key bit stream into it, performs any further security, such as encoding it with a recipient's public key, and transmits the data stream through the port 130. As a receiving device, the processor receives the incoming stream, decrypts it if necessary, and extracts the imprint. The processor then routes the signal through the voice encoder/decoder for conversion to signals appropriate for human experience.

The examples above have concentrated on audio voice signals as the experiential stream. However, other experiential streams may also benefit from these methods including audio/visual signals, other types of audio signals, video signals, etc. No limitation is implied nor should it be inferred from the above examples.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A computer controlled method for securing human to human communication over a network, the method comprising:
receiving, by a first computer, an incoming authenticated data stream from a second computer over a first communication channel from the second computer to the first computer, the incoming authenticated data stream resulting from an incoming digital experiential data stream being altered and transmitting according to a first imprint;
extracting the first imprint from the incoming authenticated data stream by analyzing received portions of experiential data in the incoming digital experiential data stream to derive the first imprint;
presenting the incoming authenticated data stream, the presenting suitable for sensory experience by a human;
inputting an outgoing digital experiential data stream to the first computer;
computing a second imprint associated with the first computer;
computing an outgoing authenticated data stream in response to the incoming authenticated data stream using the outgoing digital experiential data stream and the second imprint by including only selected portions of outgoing experiential data within the outgoing digital experiential data stream, wherein the selected portions are determined according to the second imprint; and
securing a second communication channel, from the first computer to the second computer, using the first imprint, the second communication channel suitable for sending the outgoing authenticated data stream to the second computer.

2. The computer controlled method of claim 1, wherein securing the second communication channel comprises encryption with the first imprint extracted from the incoming authenticated data stream.

3. The computer controlled method of claim 1, wherein securing the second communication channel comprises ensuring that a cryptographic hash of a key previously received for encrypting the second communication channel matches the first imprint extracted from the incoming authenticated data stream.

4. The computer controlled method of claim 1, wherein securing the second communication channel comprises ensuring that a cryptographic hash of a key previously received for authenticating messages in a key agreement protocol matches the first imprint extracted from the incoming authenticated data stream.

5. The computer controlled method of claim 1, wherein presenting the authenticated data stream comprises presenting the authenticated data stream such that tampering with the imprint degrades presentation of the authenticated data stream.

6. The computer controlled method of claim 1, wherein the imprints comprise one of a key, a cryptographic hash of a key, key information, a nonce, a certificate; with or without error correction.

7. The computer controlled method of claim 1, wherein computing the second imprint comprises:
using a digital key having a predetermined number of bits, dividing a portion the outgoing digital experiential data stream into segments, each segment corresponding to one of the predetermined number of bits; and
for each segment:
dividing a frequency band of the segment into number of sub-bands; and
transmitting one of either a first combination of sub-bands to encode a one or a second set of sub-bands to encode a zero.

8. The computer controlled method of claim 1, wherein extracting the first imprint comprises:
analyzing a frequency band of a portion of the incoming experiential data stream to determine the absence or presence of a number of sub-bands for each segment of the incoming data stream;
determining if the segment contains a first combination of sub-bands or a second combination of sub-bands;
setting a bit corresponding to each segment to a one if a received combination of sub-bands is the first combination of sub-bands, and setting the bit to a zero if the received combination of sub-bands is the second combination of sub-bands, producing an imprint having a predetermined number of bits.

9. The computer controlled method of claim 1, the method comprising:
determining that the first imprint extracted from the incoming authenticated data stream does not match a previously received key associated with the second computer; and
performing a suitable response that comprises one of terminating the connection, alerting the user.

10. The computer controlled method of claim 1, the method further comprising using timestamps on packets of the incoming authenticated data stream to determine a position of a bit in the first imprint.

11. The computer controlled method of claim 5, the method comprising allowing a human to terminate the connection on such recognition of degradation of the authenticated data stream.

12. A computer controlled method for securing human to human communication over a network, the method comprising:
initiating, at a sender, a connection with a recipient over network;
generating an authenticated outgoing experiential stream having a first imprint by selecting to include only portions of experiential data contained in an outgoing experiential data stream, where the portions included are determined by the first imprint;
transmitting the authenticated outgoing experiential stream through a first communication channel between the sender an a receiver;
receiving, over a second communication channel from the receiver to the sender, an authenticated incoming experiential stream secured using the first imprint in response to the transmitting of the authenticated outgoing experiential stream;
extracting a second imprint from the authenticated incoming experiential stream by analyzing which portions of experiential data are included in the incoming authenticated experiential data stream;

securing the first communication channel using the second imprint; and transmitting the authenticated outgoing experiential stream through the first communication channel.

13. The computer controlled method of claim 12, wherein generating the authenticated outgoing experiential stream having a first imprint comprises using a cryptographic hash of a key previously provided to the recipient from the sender and extracting a second imprint comprises extracting a cryptographic hash of a key previously provided to the sender from the recipient.

14. The computer controlled method of claim 12, wherein securing the first communication channel comprises ensuring that a cryptographic hash of the key previously provided to the sender for encrypting the first communication channel matches the second imprint extracted from the incoming authenticated data stream.

15. The computer controlled method of claim 12, wherein securing the first communication channel comprises ensuring that a cryptographic hash of a key previously provided to the sender for authenticating a key exchange protocol matches the second imprint extracted from the incoming authenticated data stream.

16. The computer controlled method of claim 12, wherein securing the first communication channel comprises encryption with the second imprint extracted from the incoming authenticated data stream.

17. The computer controlled method of claim 12, wherein generating an outgoing authenticated data stream comprises:

dividing a frequency band of a portion of the outgoing data stream into number of sub-bands, each portion corresponding to a bit in an imprint having a predetermined number of bits;

for each portion, transmitting either a first combination of sub-bands to encode a one or a second set of sub-bands to encode a zero;

performing the dividing and transmitting for a number of portions of the data stream, wherein the number of portions corresponds to the predetermined number of bits.

18. The computer controlled method of claim 12, wherein extracting the second imprint comprises:

analyzing a frequency band of a portion of the incoming experiential data stream to determine the absence or presence of a number of sub-bands for each segment of the incoming data stream;

determining if the segment contains a first combination of sub-bands or a second combination of sub-bands;

setting a bit corresponding to each segment to a one if a received combination of sub-bands is the first combination of sub-bands, and setting the bit to a zero if the received combination of sub-bands is the second combination of sub-bands, producing an imprint having a predetermined number of bits.

19. The computer controlled method of claim 12, wherein generating an outgoing authenticated data stream having the first imprint comprising imprinting each bit of the imprint over several phonemes.

* * * * *

UNITED STATES PATENT AND TRADEMARK OFFICE
CERTIFICATE OF CORRECTION

| | |
|---|---|
| PATENT NO. | : 8,023,654 B2 |
| APPLICATION NO. | : 11/612001 |
| DATED | : September 20, 2011 |
| INVENTOR(S) | : Paul J. Stewart et al. |

Page 1 of 1

It is certified that error appears in the above-identified patent and that said Letters Patent is hereby corrected as shown below:

On the Front Page, section (73) the Assignee reads as "Palo Alto Research Center Incorporated, Palo Alto, Ca (US)", it should read -- Palo Alto Research Center Incorporated, Palo Alto, CA (US) and Samsung Electronics Co., Ltd., Republic of Korea --.

Signed and Sealed this
Twelfth Day of June, 2012

David J. Kappos
*Director of the United States Patent and Trademark Office*